(12) United States Patent
Shin et al.

(10) Patent No.: US 11,215,888 B2
(45) Date of Patent: Jan. 4, 2022

(54) LIQUID CRYSTAL DISPLAY

(71) Applicant: Samsung Display Co., Ltd., Yongin-Si (KR)

(72) Inventors: Dong Hee Shin, Asan-si (KR); Kyung Ho Kim, Seongnam-si (KR); Yoo Mi Ra, Ansan-si (KR); Seong Young Lee, Hwaseong-si (KR); Yong Hee Lee, Suwon-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/737,836

(22) Filed: Jan. 8, 2020

(65) Prior Publication Data

US 2021/0026209 A1  Jan. 28, 2021

(30) Foreign Application Priority Data

Jul. 24, 2019  (KR) ........................ 10-2019-0089853

(51) Int. Cl.
*G02F 1/1362* (2006.01)
*G02F 1/1368* (2006.01)
*G02F 1/1335* (2006.01)
*G02F 1/1343* (2006.01)

(52) U.S. Cl.
CPC ...... *G02F 1/136227* (2013.01); *G02F 1/1368* (2013.01); *G02F 1/133512* (2013.01); *G02F 1/133514* (2013.01); *G02F 1/134336* (2013.01); *G02F 1/136286* (2013.01)

(58) Field of Classification Search
CPC ............. G02F 1/136286; G02F 1/1368; G02F 1/136277; G02F 2001/136222; H01L 27/124; H01L 27/3262
See application file for complete search history.

(56) References Cited

U.S. PATENT DOCUMENTS

| | | | |
|---|---|---|---|
| 2005/0167669 A1* | 8/2005 | Kim | H01L 27/124 257/72 |
| 2014/0132867 A1* | 5/2014 | Cho | G02F 1/133377 349/42 |
| 2016/0109773 A1* | 4/2016 | Lee | G02F 1/136286 349/138 |

FOREIGN PATENT DOCUMENTS

| | | |
|---|---|---|
| KR | 10-2010-0070663 A | 6/2010 |
| KR | 10-2010-0105914 A | 10/2010 |
| KR | 10-2013-0105777 A | 9/2013 |
| KR | 10-2014-0006490 A | 1/2014 |
| KR | 10-2016-0117786 A | 10/2016 |

* cited by examiner

*Primary Examiner* — Angela K Davison
(74) *Attorney, Agent, or Firm* — Innovation Counsel LLP

(57) ABSTRACT

An embodiment of the present inventive concept provides a liquid crystal display, including: a first gate line; a first data line crossing the first gate line; a first transistor including a gate electrode connected to the first gate line, a source electrode connected to the first data line, and a drain electrode; a first connecting line connected to the drain electrode; a first contact portion connected to the first connecting line; and a first pixel electrode connected to the first contact portion, wherein the first pixel electrode may be disposed between the first transistor and the first contact portion.

10 Claims, 5 Drawing Sheets

LIQUID CRYSTAL DISPLAY

CROSS-REFERENCE TO RELATED APPLICATION

This application claims priority to and the benefit of Korean Patent Application No. 10-2019-0089853 filed in the Korean Intellectual Property Office on Jul. 24, 2019, the entire contents of which are incorporated herein by reference.

BACKGROUND

(a) Field

Embodiments of the present inventive concept relates to a display device. More particularly, the present inventive concept relates to a liquid crystal display.

(b) Description of the Related Art

Currently, liquid crystal displays are one of the most widely used display devices. A liquid crystal display includes a display panel on which an electrode is formed and a liquid crystal layer, and it rearranges liquid crystal molecules of the liquid crystal layer by applying a voltage to an electrode to form an electric field, and displays an image by controlling transmittance of light.

Each of a plurality of pixels included in the liquid crystal display includes a pixel electrode, a common electrode, and a transistor connected to the pixel electrode. The transistor is connected to a gate line transmitting a gate signal generated by a gate driver and to a data line transmitting a data voltage generated by a data driver, and transmits the data voltage to the pixel electrode according to the gate signal.

The above information disclosed in this Background section is only for enhancement of understanding of the background of the invention, and therefore it may contain information that does not form the prior art that is already known in this country to a person of ordinary skill in the art.

SUMMARY

The transistor is connected to a contact portion for connecting with the pixel electrode, and the transistor and the pixel electrode are connected through the contact portion. The transistor and the contact portion are disposed together at one side of the pixel electrode, and a light blocking portion covers the transistor and the contact portion to not be viewed by a user. The light blocking portion should have a width that may cover the transistor and the contact portion. When the width of the light blocking portion is wider, an aperture ratio of the liquid crystal display may decrease, and in some cases, a defect in which a horizontal line is viewed due to the light blocking portion may occur.

Embodiments of the present inventive concept has been made in an effort to provide a liquid crystal display that may reduce a width of a light blocking portion by efficiently disposing a transistor and a contact portion.

An embodiment of the present inventive concept provides a liquid crystal display, including: a first gate line; a first data line crossing the first gate line; a first transistor including a gate electrode connected to the first gate line, a source electrode connected to the first data line, and a drain electrode; a first connecting line connected to the drain electrode; a first contact portion connected to the first connecting line; and a first pixel electrode connected to the first contact portion, wherein the first pixel electrode may be disposed between the first transistor and the first contact portion.

The first connecting line may extend across the first pixel electrode.

The first pixel electrode may include: a horizontal stem portion extending in a first direction; a vertical stem portion extending in a second direction crossing the first direction; and a plurality of minute branch portions each extending in a diagonal direction from one of the horizontal stem portion and the vertical stem portion, and the first connecting line may overlap the vertical stem portion and extend in the second direction.

The first pixel electrode may further include a first extension portion protruding in the second direction and overlapping the first contact portion.

The liquid crystal display may further include an insulating layer disposed between the first contact portion and the first extension portion, wherein the insulating layer may include an opening overlapping the first contact portion and the first extension portion, and the first contact portion and the first extension portion may contact each other through the opening.

The liquid crystal display may further include: a first light blocking portion covering the first gate line and the first transistor; and a second light blocking portion spaced apart from the first light blocking portion with the first pixel electrode therebetween, the second light blocking portion covering the first contact portion.

The liquid crystal display may further include: a second gate line adjacent to the first gate line; a second transistor including a gate electrode connected to the second gate line a source electrode connected to the first data line, and a drain electrode; a second connecting line connected to the drain electrode; a second contact portion connected to the second connecting line and adjacent to the first contact portion; and a second pixel electrode connected to the second contact portion, wherein the second pixel electrode may be disposed between the second transistor and the second contact portion, the first pixel electrode and the second pixel electrode may be disposed between the first gate line and the second gate line, and the first contact portion and the second contact portion may be disposed between the first pixel electrode and the second pixel electrode.

The liquid crystal display may further include: a first color filter overlapping the first pixel electrode; and a second color filter overlapping the second pixel electrode, wherein the first color filter and the second color filter may be spaced apart from each other with both the first contact portion and the second contact portion therebetween.

The liquid crystal display may further include: a liquid crystal layer disposed on the first pixel electrode and the second pixel electrode; a second substrate facing the each of first pixel electrode and the second pixel electrode with the liquid crystal layer therebetween; and a color filter disposed on the second substrate and overlapping the first pixel electrode, the second pixel electrode, the first contact portion, and the second contact portion.

The liquid crystal display may further include: a second data line adjacent to the first data line; a third transistor including a gate electrode connected to the first gate line and a source electrode connected to the second data line and adjacent to the first transistor; and a fourth transistor including a gate electrode connected to the second gate line and a source electrode connected to the second data line and adjacent to the second transistor.

The liquid crystal display may further include: a first light blocking portion covering the first gate line, the first transistor, and the third transistor; a second light blocking portion spaced apart from the first light blocking portion with the first pixel electrode therebetween, the second light blocking portion covering the first contact portion and the second contact portion; and a third light blocking portion covering the second gate line, the second transistor, and the fourth transistor.

The first data line and the second data line may each overlap the first pixel electrode and the second pixel electrode.

Another embodiment of the present inventive concept provides a liquid crystal display, including: a first gate line; a second gate line adjacent to the first gate line; a plurality of contact portions disposed between the first gate line and the second gate line; a first pixel electrode disposed between the first gate line and the plurality of contact portions; and a second pixel electrode disposed between the second gate line and the plurality of contact portions, wherein a first contact portion of the plurality of contact portions may be connected to the first pixel electrode, and a second contact portion of the plurality of contact portions may be connected to the second pixel electrode.

The liquid crystal display may further include: a plurality of transistors facing the first contact portion and the second contact portion with the first pixel electrode therebetween, at least one of the plurality of transistors connected to the first gate line; and a plurality of transistors facing the first contact portion and the second contact portion with the second pixel electrode therebetween at least one of the plurality of transistors connected to the second gate line.

A first transistor of the plurality of transistors connected to the first gate line may be connected to the first contact portion, and a second transistor of the plurality of transistors connected to the second gate line may be connected to the second contact portion.

The liquid crystal display may further include: a first connecting line connecting the first transistor and the first contact portion and overlapping the first pixel electrode; and a second connecting line connecting the second transistor and the second contact portion and overlapping the second pixel electrode.

The liquid crystal display may further include: a first data line connected to the first transistor and the second transistor; and a second data line connected to a third transistor of the plurality of transistors connected to the first gate line and a fourth transistor of the plurality of transistors connected to the second gate line.

The first data line and the second data line may overlap the first pixel electrode and the second pixel electrode, and the first connecting line and the second connecting line may be disposed between the first data line and the second data line.

The liquid crystal display may further include: a first light blocking portion covering the first gate line; a second light blocking portion spaced apart from the first light blocking portion with the first pixel electrode therebetween, the second light blocking portion covering the plurality of contact portions; and a third light blocking portion covering the second gate line and spaced apart from the second light blocking portion with the second pixel electrode therebetween.

The liquid crystal display may further include: a first color filter overlapping the first pixel electrode; and a second color filter spaced apart from the first color filter with the plurality of contact portions therebetween and covering the second pixel electrode.

According to the embodiments of the present inventive concept, by efficiently disposing the transistor and the contact portion, the aperture ratio of the liquid crystal display may be improved, and the defect in which the horizontal line is viewed due to the light blocking portion may be prevented.

DETAILED DESCRIPTION

Figure 1:
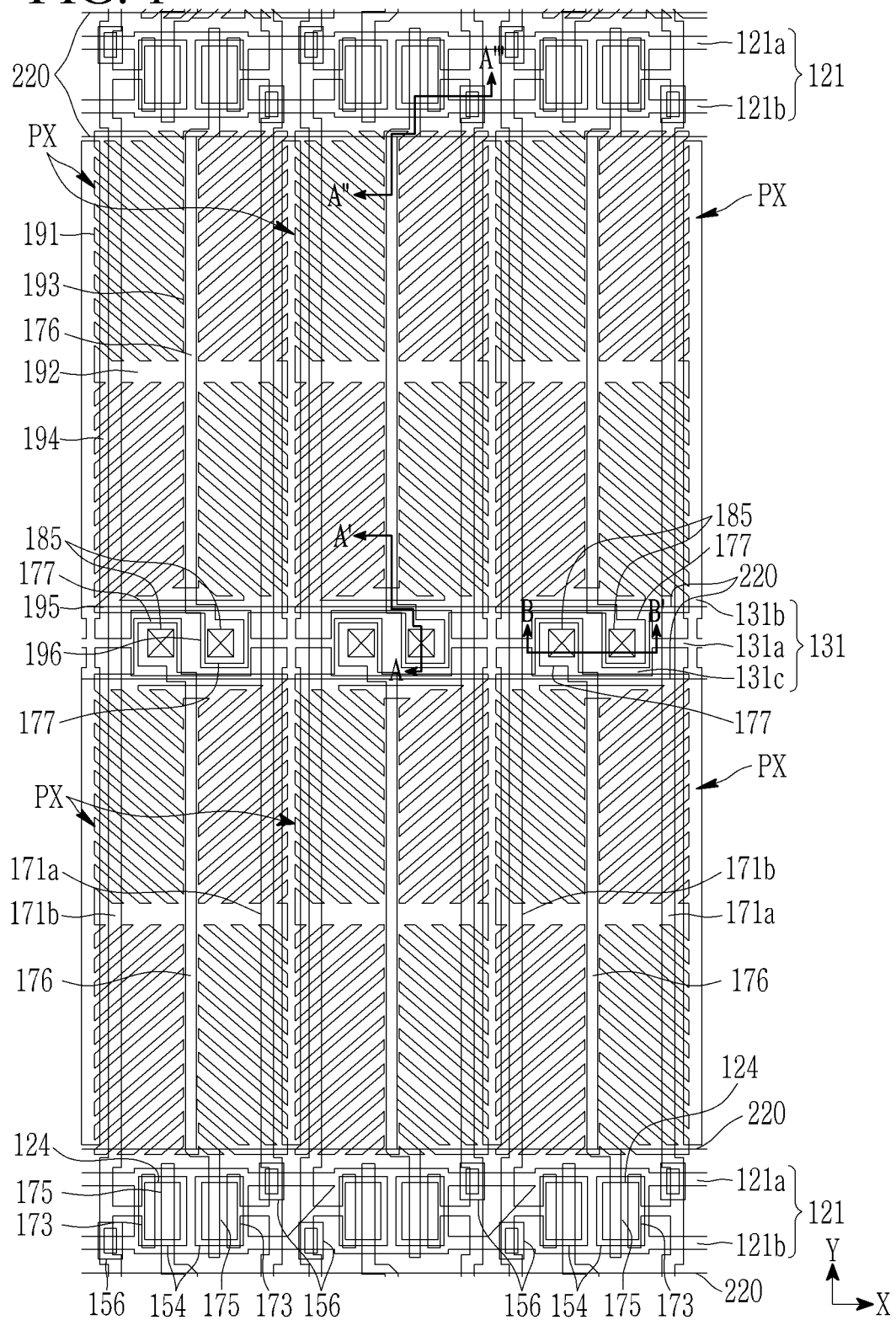
FIG. 1 illustrates a plan view of a liquid crystal display according to an embodiment of the present inventive concept.

Embodiments of the present inventive concept will be described more fully hereinafter with reference to the accompanying drawings, in which an exemplary embodiment of the invention is shown. As those skilled in the art would realize, the described embodiments may be modified in various different ways, all without departing from the spirit or scope of the present disclosure.

Parts that are irrelevant to the description will be omitted to clearly describe the present disclosure, and like reference numerals designate like elements throughout the specification.

Further, in the drawings, the size and thickness of each element are illustrated by way of example for ease of description, and the present disclosure is not necessarily limited to those illustrated in the drawings. In the drawings, the thicknesses of layers, films, panels, regions, etc., may be exaggerated for clarity.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means disposed on or under the object portion, and does not necessarily mean disposed on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" means viewing a target portion from the top, and the phrase "in a cross-sectional view" means viewing a cross-section formed by vertically cutting a target portion from the side.

Further, throughout the specification, the word "overlapped" means a vertically overlapped state in a cross-section, or an entirely or partially disposed state in the same region in a plan view.

Hereinafter, a liquid crystal display according to an embodiment of the present inventive concept will be described with reference to FIG. 1 to FIG. 3.

FIG. 1 illustrates a plan view of a liquid crystal display according to an embodiment of the present inventive concept. FIG. 2 illustrates a cross-sectional view of an embodiment taken along line A-A' and line A"-A'" of FIG. 1. FIG. 3 illustrates a cross-sectional view taken along line B-B' of FIG. 1.

Figure 2:
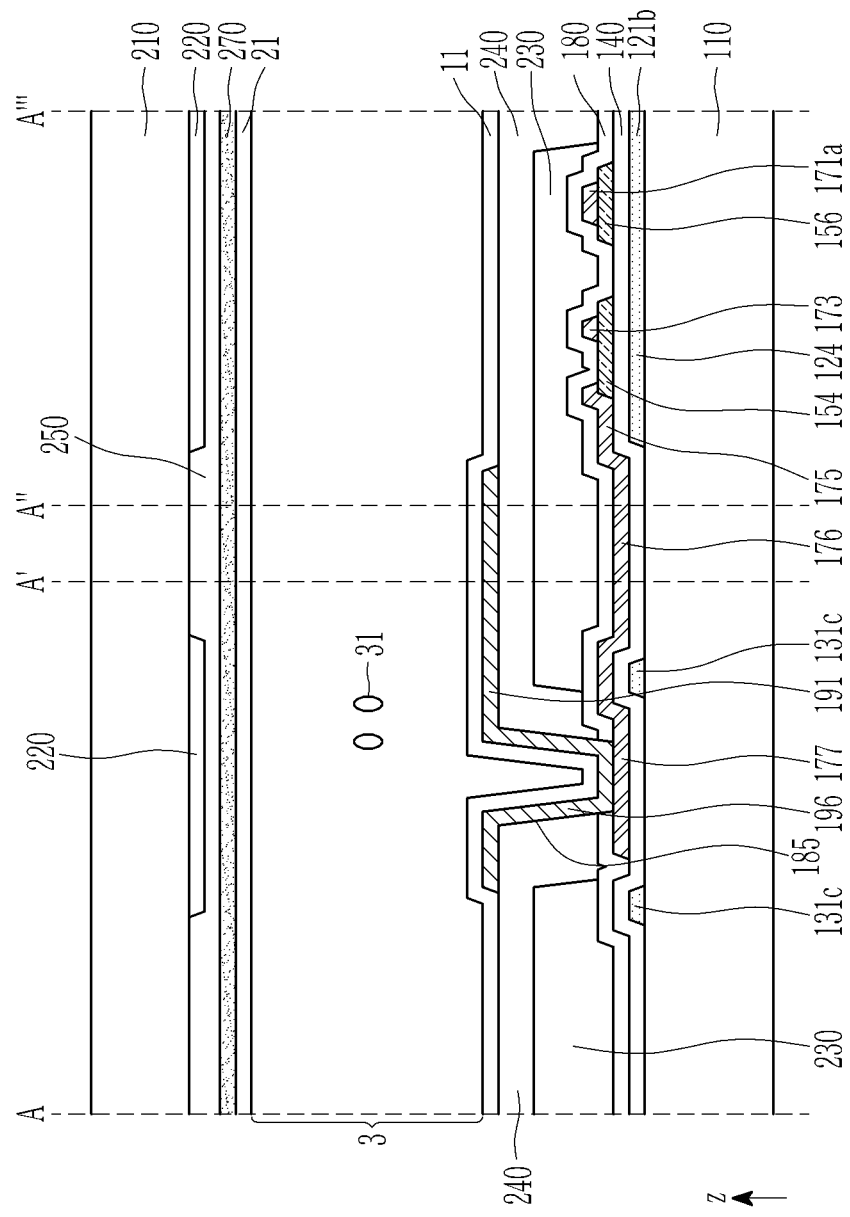
FIG. 2 illustrates a cross-sectional view of an embodiment taken along line A-A' and line A"-A'" of FIG. 1.
Figure 3:
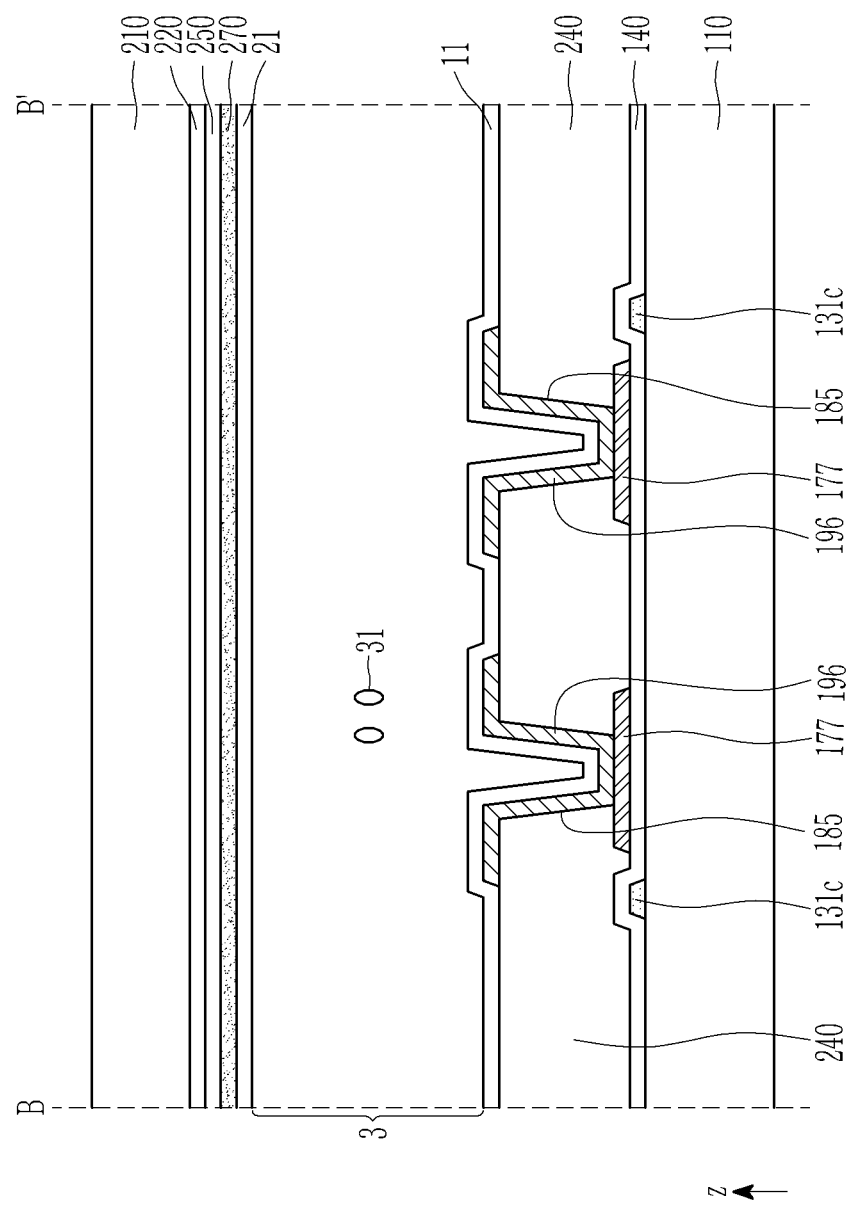
FIG. 3 illustrates a cross-sectional view of an embodiment taken along line B-B' of FIG. 1.

Referring to FIG. 1 to FIG. 3, the liquid crystal display includes a plurality of pixels PX. The plurality of pixels PX may be arranged in a first direction X and a second direction Y in a plan view. The second direction Y crosses the first direction X. The second direction Y may be a direction perpendicular to the first direction X. A third direction Z may be a direction perpendicular to a plane formed by the first direction X and the second direction Y.

FIG. 1 illustrates an example in which three pixels PX are arranged in the first direction X and two pixels PX are arranged in the second direction Y. A configuration of one pixel PX will be first described with reference to FIG. 1 to FIG. 3, and then an arrangement of a plurality of gate lines 121, a plurality of pixel electrodes 191, a plurality of transistors, a plurality of contact portions 177, and the like will be described.

The liquid crystal display includes a first substrate 110 and a second substrate 210 facing each other, and a liquid crystal layer 3 disposed between the first substrate 110 and the second substrate 210.

A configuration on the first substrate 110 will be described below.

A gate conductive layer including the gate line 121, a gate electrode 124, and a storage electrode line 131 is disposed on the first substrate 110. The gate conductive layer may include at least one of copper (Cu), aluminum (Al), magnesium (Mg), silver (Ag), gold (Au), platinum (Pt), palladium (Pd), nickel (Ni), neodymium (Nd), iridium (Ir), molybdenum (Mo), tungsten (W), titanium (Ti), chromium (Cr), tantalum (Ta), and an alloy thereof.

The gate line 121 may include a plurality of gate lines 121a and 121b. The gate line 121 may extend in the first direction X. The gate line 121 may include two gate lines 121a and 121b. The two gate lines 121a and 121b may extend in parallel in the first direction X and may be connected to each other to surround the gate electrode 124. The gate line 121 may include the gate electrode 124.

The storage electrode line 131 is spaced apart from the gate line 121 and the gate electrode 124, and may transmit a constant voltage such as a common voltage. The storage electrode line 131 may be disposed on the same layer as the gate line 121 on the first substrate 110. The storage electrode line 131 may be formed of the same material as the gate line 121.

The storage electrode line 131 may include a horizontal portion 131a extending in the first direction X, a plurality of vertical portions 131b connected to the horizontal portion 131a and extending in the second direction Y, and an extended portion 131c of which a portion of the horizontal portion 131a extends. The plurality of vertical parts 131b may be disposed at opposite sides of the pixel electrode 191. The storage electrode line 131 may overlap an edge of the pixel electrode 191.

A gate insulating film 140 is disposed on the gate conductive layer. The gate insulating film 140 may include an inorganic insulating material such as a silicon nitride (SiNx), a silicon oxynitride (SiON), and/or a silicon oxide (SiOx).

A semiconductor layer including a channel semiconductor 154 and a plurality of step-preventing semiconductors 156 is disposed on the gate insulating film 140. The semiconductor layer may include amorphous silicon or polycrystalline silicon, and/or an oxide semiconductor material. The channel semiconductor 154 may overlap the gate electrode 124.

A data conductive layer including a pair of data lines 171a and 171b, a source electrode 173, a drain electrode 175, a connecting line 176, and a contact portion 177 is disposed on the gate insulating film 140 and the semiconductor layer. The data conductive layer may include at least one of copper (Cu), aluminum (Al), magnesium (Mg), silver (Ag), gold (Au), platinum (Pt), palladium (Pd), nickel (Ni), neodymium (Nd), iridium (Ir), molybdenum (Mo), tungsten (W), titanium (Ti), chromium (Cr), tantalum (Ta), and an alloy thereof.

The data line includes a first data line 171a and a second data line 171b. The data line extends in the second direction Y and crosses the gate line 121. The first data line 171a may extend in the second direction Y and be connected to the source electrode 173. In addition, the second data line 171b may also extend in the second direction Y and be connected to the source electrode 173. The first data line 171a and the second data line 171b may overlap the pixel electrode 191. The vertical portion 131b of the storage electrode line 131 may be disposed between the first data line 171a overlapping one pixel electrode 191 and the second data line 171b overlapping another pixel electrode 191 adjacent to one pixel electrode 191 in the first direction X.

The source electrode 173 may be formed to extend from the data line 171 in the first direction X and then extend in a bar shape in the second direction Y. However, the shape of the source electrode 173 is not limited thereto.

The plurality of step-preventing semiconductors 156 may be disposed between portions where the gate conductive layer and the data line cross each other. The plurality of step-preventing semiconductors 156 may prevent the data line from being disconnected by a step occurring due to the gate conductive layer.

The drain electrode 175 is spaced apart from the data line 171 and the source electrode 173. The drain electrode 175 may be formed to extend in a bar shape in the second direction Y in an area overlapping the gate electrode 124 to face the source electrode 173. Most of an area between the source electrode 173 and the drain electrode 175 facing each other may overlap the channel semiconductor 154. However, the shape of the drain electrode 175 is not limited thereto.

The connecting line 176 may extend in the second direction Y from the drain electrode 175 to overlap the pixel electrode 191. The connecting line 176 may extend across the pixel electrode 191 to an opposite side of the pixel electrode 191.

The contact portion 177 is disposed at an opposite side of the drain electrode 175 with the pixel electrode 191 therebetween. The contact portion 177 may be connected to an end of the connecting line 176 that crosses the pixel electrode 191. That is, the pixel electrode 191 is disposed between the transistor including the drain electrode 175 and the contact portion 177, and the contact portion 177 may be connected to the transistor through the connecting line 176. The contact portion 177 may have an extended shape at an end of the connecting line 176, e.g., the contact portion 177 may be a rectangle or square with greater width than a width of the connecting line 176. A portion of the contact portion 177 may partially overlap the extended portion 131c of the storage electrode line 131. The contact portion 177 may overlap the extended portion 131c of the storage electrode line 131 with the gate insulating film 140 therebetween to form the storage capacitor. The storage capacitor may serve to maintain voltages applied to the drain electrode 175 and the pixel electrode 191 connected thereto even when no data voltage from the data lines 171a and 171b is applied to the drain electrode 175 and the pixel electrode 191.

The gate electrode 124, the source electrode 173, and the drain electrode 175 together with the channel semiconductor 154 form a transistor that is a switching element. A channel of the transistor is formed in the channel semiconductor 154 between the source electrode 173 and the drain electrode 175.

A first insulating layer 180 is disposed on the data conductive layer and the exposed semiconductor layer. The first insulating layer 180 may include an inorganic insulating material such as a silicon nitride (SiNx) and/or a silicon oxide (SiOx).

A color filter 230 may be disposed on the first insulating layer 180. The color filter 230 may include an inorganic insulating material and/or an organic insulating material. The color filter 230 may uniquely display one of the primary colors. The color filter 230 overlaps the pixel electrode 191. The color filter 230 may extend in the second direction Y and have a rectangular shape covering at least a portion of the pixel electrode 191; the color filter 230 may cover an entirety of the pixel electrode 191. The color filter 230 may overlap the transistor. FIG. 2 illustrates an embodiment in which the color filter 230 is disposed in an area overlapping the pixel electrode 191 and the transistor. Alternatively, the color filter 230 may not overlap the transistor, but may overlap only the pixel electrode 191. The color filter 230 may not overlap the contact portion 177. The color filter 230 may be spaced apart from an adjacent color filter 230 with the contact portion 177 therebetween. That is, one color filter 230 may be disposed to correspond to one pixel electrode 191.

A second insulating layer 240 is disposed on the color filter 230 and the contact portion 177. The second insulating layer 240 may include an inorganic insulating material and/or an organic insulating material.

The first insulating layer 180 and the second insulating layer 240 may include an opening 185. The opening 185 overlaps the contact portion 177. The contact portion 177 may be connected (e.g., electrically and/or physically) to the pixel electrode 191 through the opening 185, and the pixel electrode 191 may be connected to the transistor.

A pixel electrode layer including the pixel electrode 191 may be disposed on the second insulating layer 240. The pixel electrode layer may include a transparent conductive material such as an indium tin oxide (ITO) or an indium zinc oxide (IZO), and/or a metal such as aluminum (Al), silver (Ag), chromium (Cr), and/or an alloy thereof.

In a plan view, an overall shape of the pixel electrode 191 may be approximately square, and the pixel electrode 191 may include a pattern of which a portion is removed (e.g., the pixel electrode 191 may have a shape of a solid polygon, such as a rectangle, with portions removed thereby making minute slits, discussed further below). The pixel electrode 191 includes a horizontal stem portion 192, a vertical stem portion 193, a plurality of minute branch portions 194, a connecting portion 195, and an extension portion 196.

The horizontal stem portion 192 may extend in the first direction X, and the vertical stem portion 193 may be connected to the horizontal stem portion 192 in a cross shape to extend in the second direction Y. The plurality of minute branch portions 194 extend in a diagonal direction oblique to the first direction X and the second direction Y from one of the horizontal stem portion 192 and the vertical stem portion 193. The minute branch portions 194 facing each other with the horizontal stem portion 192 therebetween extend in different directions. The minute branch portions 194 facing each other with the vertical stem portion 193 therebetween extend in different directions. Portions of the electrode are removed between adjacent minute branch portions 194, the resulting spaces which are called minute slits. An acute angle formed by the minute branch portion 194 with the horizontal stem portion 192 or the vertical stem portion 193 may be about 40° to about 45°, but the degree of the acute angle is not limited thereto, and it may be appropriately adjusted by considering display characteristics such as visibility of the liquid crystal display.

The extension portion 196 may be connected to the minute branch portion 194 through the connecting portion 195. The connecting portion 195 may extend in the first direction X by a width of the pixel electrode 191 at an end of the minute branch portion 194. The extension portion 196 may have a shape protruding in the second direction Y from the connecting portion 195 at one side (a left or right side) based on the vertical stem portion 193. The extension portion 196 may overlap the contact portion 177 and the opening 185, and may contact the contact portion 177 through the opening 185. That is, the pixel electrode 191 may be connected to the contact portion 177 through the opening 185, may be connected to the transistor through the connecting line 176 connected to the contact portion 177, and may receive a data voltage through the transistor.

As described above, when the pixel electrode 191 has a shape that includes the horizontal stem portion 192, the vertical stem portion 193, and the plurality of minute branch portions 194, the connecting line 176 may overlap the vertical stem portion 193 while extending in the second direction Y. As the connecting line 176 extends in the second direction Y and overlaps the vertical stem portion 193, a decrease of the aperture ratio of the pixel PX resulting from the connecting line 176 may be reduced.

End portions of left and right edges of the pixel electrode 191 may overlap the vertical portion 131b of the storage electrode line 131. In some embodiments, the left and right edges of the pixel electrode 191 may not overlap the vertical portion 131b.

Hereinafter, the second substrate 210 facing the first substrate 110 of the lower side and disposed above the first substrate 110 will be described.

A light blocking portion 220 may be disposed below the second substrate 210. The light blocking portion 220 may include a first light blocking portion and a second light blocking portion. The first light blocking portion extends in the first direction X to cover the gate line 121 and the transistor connected to the gate line 121. For example, in some embodiments the first light blocking portion may cover an entirety of the gate line 121 and the transistor connected to the gate line 121; however, in other embodiments the first light blocking portion may only cover a portion of each, that is less than an entirety. The second light blocking portion extends in the first direction X to cover the contact portion 177, the opening 185, and the extension portion 196. For example, in some embodiments the second light blocking portion may cover an entirety of the contact portion 177, the opening 185, and the extension portion; however, in other embodiments the second light blocking portion may only cover a portion of each, that is less than an entirety. The first light blocking portion is spaced apart from the second light blocking portion with the pixel electrode 191 therebetween. The light blocking portion 220 may block light leakage between adjacent pixel electrodes 191.

An overcoat 250 may be disposed under the light blocking portion 220 to provide a flat surface. The overcoat 250 may include an insulating material. In some embodiments, the overcoat 250 may be omitted.

A common electrode 270 is disposed under the overcoat 250. The common electrode 270 may be continuously formed in most of an area corresponding to the display area in which an image is displayed. Like the pixel electrode layer, the common electrode 270 may also include a transparent conductive material such as ITO or IZO, or a metal such as aluminum (Al), silver (Ag), chromium (Cr), or an alloy thereof. In some embodiments, the common electrode 270 may not be patterned to include a slit or the like, but in other embodiments, the common electrode 270 may include a slit, a cutout, or the like formed in a portion thereof.

The liquid crystal layer 3 is disposed between the first substrate 110 and the second substrate 210. The liquid crystal layer 3 may include liquid crystal molecules 31 having negative dielectric anisotropy. The liquid crystal molecules 31 may be aligned such that their major axes are inclined perpendicularly or by a predetermined angle with respect to surfaces of the first substrate 110 and the second substrate 210 in the absence of an electric field in the liquid crystal layer 3. The liquid crystal molecules 31 may be pre-tilted according to a fringe field or step between edges of the patterned portions of the pixel electrode 191 (for example, the minute branch portion 194) and the common electrode 270.

A first alignment film 11 covering the pixel electrode 191 and the second insulating layer 240 may be disposed in the first substrate 110, and a second alignment film 21 may be disposed under the common electrode 270 in the second substrate 210. The first alignment film 11 and the second alignment film 21 may be vertical alignment films. On the surfaces of the first alignment film 11 and the second alignment film 21 adjacent to the liquid crystal layer 3, a plurality of polymer protrusions may be disposed. The plurality of polymer protrusions may be formed by reacting a reactive monomer (RM) with light such as ultraviolet rays, and may function to maintain the pre-tilt of the liquid crystal molecules 31.

The pixel electrode 191 to which a data voltage is applied generates an electric field together with the common electrode 270 of the second substrate 210. According to the generated electric field, an alignment direction of the liquid crystal molecules 31 disposed between the pixel electrode 191 and the common electrode 270 is determined. Luminance of light passing through the liquid crystal layer 3 is controlled according to the determined alignment direction of the liquid crystal molecules 31.

Hereinafter, an arrangement of the plurality of gate lines 121, the plurality of pixel electrodes 191, the plurality of transistors, the plurality of contact portions 177, and the like will be described.

As illustrated in FIG. 1, the plurality of contact portions 177 are disposed between two adjacent gate lines 121. The first pixel electrode (for example, an upper pixel electrode in a plan view such as that shown in FIG. 1) is disposed between the first gate line (for example, an upper gate line in a plan view such as that shown in FIG. 1) of the two gate lines 121 and the plurality of contact portions 177. The second pixel electrode (for example, a lower pixel electrode in a plan view such as that shown in FIG. 1) is disposed between the second gate line (for example, a lower gate line in a plan view) of the two gate lines 121 and the plurality of contact portions 177.

Among the two contact portions 177 disposed between the first pixel electrode and the second pixel electrode, the first contact portion (for example, the contact portion at the right side in a plan view such as that shown in FIG. 1) is connected to the first pixel electrode, and the second contact portion (for example, the contact portion at the left side in a plan view such as that shown in FIG. 1) is connected to the second pixel electrode. The first contact portion and the second contact portion may be arranged to be adjacent to each other in the first direction X. The first pixel electrode and the second pixel electrode may face each other with two contact portions 177 therebetween.

The plurality of transistors connected to the first gate line face the first contact portion and the second contact portion with the first pixel electrode therebetween. The first transistor (for example, a transistor at the right side in a plan view such as that shown in FIG. 1) among the plurality of transistors connected to the first gate line may be connected to the first contact portion through the connecting line 176 overlapping the first pixel electrode.

The plurality of transistors connected to the second gate line face the first contact portion and the second contact portion with the second pixel electrode therebetween. The second transistor (for example, a transistor at the right side in a plan view such as that shown in FIG. 1) among the plurality of transistors connected to the second gate line may be connected to the second contact portion through the connecting line 176 overlapping the second pixel electrode.

The first transistor and the second transistor may be connected to the same data line. For example, the first transistor and the second transistor may be connected to the first data line 171a adjacent thereto.

The third transistor (for example, a transistor at the left side in a plan view such as that shown in FIG. 1) among the plurality of transistors connected to the first gate line and the fourth transistor (for example, a transistor at the left side in a plan view such as that shown in FIG. 1) among the plurality of transistors connected to the second gate line may be connected to the second data line 171b. That is, the third transistor and the fourth transistor may be connected to the same data line. The third transistor may be connected to a pixel electrode (not shown) facing the first pixel electrode with the first gate line therebetween. The fourth transistor may be connected to a pixel electrode (not shown) facing the second pixel electrode with the second gate line therebetween. The first transistor and the third transistor may be arranged adjacent to each other in the first direction X. The second transistor and the fourth transistor may be arranged adjacent to each other in the first direction X.

The connecting line 176 connecting the first transistor and the first pixel electrode is disposed between the first data line 171a and the second data line 171b each overlapping the first pixel electrode and the second pixel electrode. The connecting line 176 connecting the second transistor and the second pixel electrode is disposed between the first data line 171a and the second data line 171b each overlapping the first pixel electrode and the second pixel electrode.

The plurality of light blocking portions 220 extend in the first direction X to cover the plurality of gate lines 121, the plurality of transistors, and the plurality of contact portions 177. The plurality of light blocking portions 220 may include the first light blocking portion, the second light blocking portion, and a third light blocking portion. The first light blocking portion covers the first gate line, the first transistor, and the third transistor. The second light blocking portion covers the first contact portion and the second contact portion. The third light blocking portion covers the second gate line, the second transistor, and the fourth transistor. For example, in some embodiments the third light blocking portion may cover an entirety of the second gate line, the second transistor, and the fourth transistor; however, in other embodiments the first light blocking portion may only cover a portion of each, that is less than an entirety. The first light blocking portion is spaced apart from the second light blocking portion with the first pixel electrode therebetween. The second light blocking portion is spaced apart from the third light blocking portion with the second pixel electrode therebetween.

As described above, when the plurality of light blocking portions 220 extending in the first direction X are arranged in the second direction Y, the pixel electrode 191 may be disposed between the adjacent light blocking portions 220 among the light blocking portions 220; one of the light blocking portions 220 adjacent to each other may cover a transistor connected to the pixel electrode 191, and the other thereof may cover a contact portion connected to the transistor; and the transistor and the pixel electrode may be connected through the contact portion.

Two transistors are arranged in the first direction X at one side of the pixel electrode 191, and two contact portions 177 are arranged in the first direction X at the other side of the pixel electrode 191, thus a width of the light blocking portion 220 disposed between the electrodes 191 may be reduced. Therefore, the aperture ratio of the liquid crystal display may be improved, preventing a defect in which a horizontal line resulting from to the light blocking portion 220 is displayed.

Hereinafter, a liquid crystal display of another embodiment will be described with reference to FIG. 4 and FIG. 5. Since the embodiment of FIG. 1 and FIG. 2 has been described above, the following description will focus mainly on the differences in FIG. 4 and FIG. 5.

Figure 4:
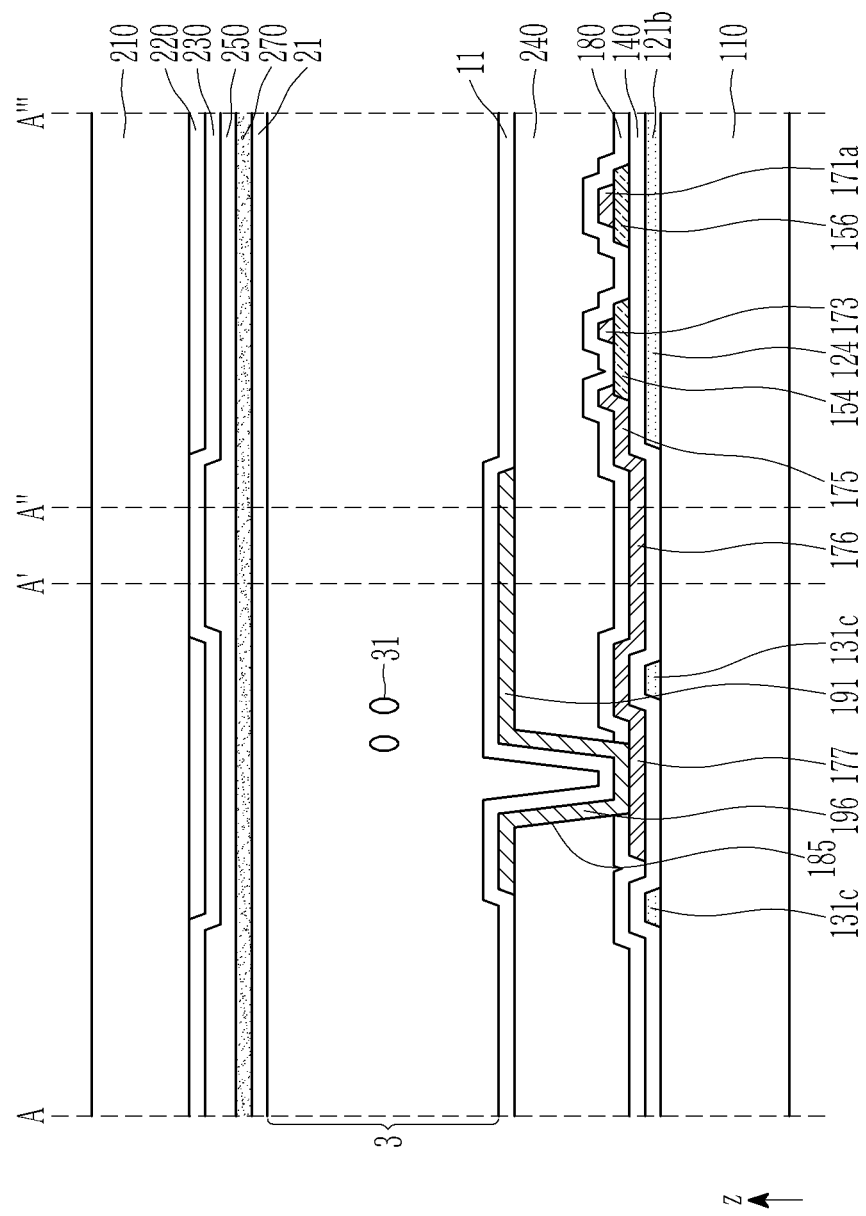
FIG. 4 illustrates a cross-sectional view of another embodiment taken along line A-A' and line A"-A'" of FIG. 1.

FIG. 4 illustrates a cross-sectional view of another embodiment taken along line A-A' and line A''-A''' of FIG. 1. FIG. 5 illustrates a cross-sectional view of another embodiment taken along line B-B' of FIG. 1.

Figure 5:
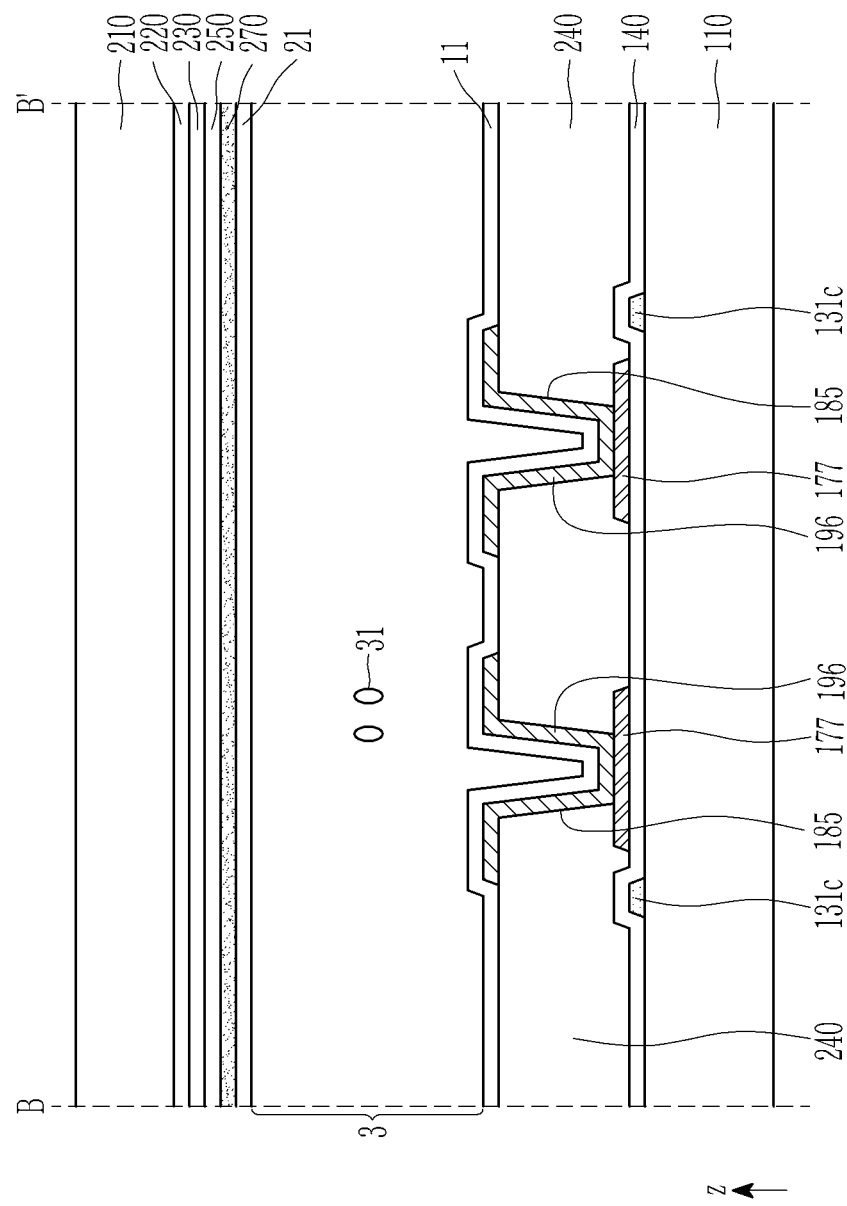
FIG. 5 illustrates a cross-sectional view of another embodiment taken along line B-B' of FIG. 1.

In FIG. 2 and FIG. 3, the color filter 230 is formed on the first substrate 110, whereas in FIG. 4 and FIG. 5, the color filter 230 is formed on the second substrate 210.

As illustrated in FIG. 4 and FIG. 5, the second insulating layer 240 may be disposed directly on the first insulating layer 180.

The color filter 230 may be disposed below the second substrate 210 and the light blocking portion 220. The color filter 230 may not only overlap the pixel electrode 191 but also overlap the transistor and the contact portion 177. The color filter 230 may extend in the second direction Y along one pixel column and overlap a plurality of pixels included in the one pixel column. The first color filter overlapping the first pixel column, the second color filter overlapping an adjacent second pixel column, and the third color filter overlapping the adjacent third pixel column may be color filters used to display different colors. For example, the first color filter may be a red color filter, the second color filter may be a green color filter, and the third color filter may be a blue color filter.

The overcoat 250 may be disposed under the color filter 230. The overcoat 250 may be omitted, and the common electrode 270 may be disposed under the color filter 230.

Since the color filter 230 is formed on the upper second substrate 210, reflection of external light may be reduced. In addition, since the color filter 230 is formed on the upper second substrate 210, it is not necessary to secure a separating distance between the contact portion 177 and the color filter 230, and thus the aperture ratio of the liquid crystal display may be further improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, those skilled in the art will understand that various modifications and other equivalent embodiments of the present inventive concept are possible. Consequently, the true technical protective scope of the present inventive concept must be determined based on the technical spirit of the appended claims.

What is claimed is:

1. A liquid crystal display, comprising:
   a first gate line;
   a first data line crossing the first gate line;
   a first transistor including a gate electrode connected to the first gate line, a source electrode connected to the first data line, and a drain electrode;
   a first connecting line connected to the drain electrode;
   a first contact portion connected to the first connecting line; and
   a first pixel electrode connected to the first contact portion,
   wherein the first pixel electrode includes:
   a horizontal stem portion extending in a first direction;
   a vertical stem portion extending in a second direction crossing the first direction; and
   a plurality of minute branch portions each extending in a diagonal direction from one of the horizontal stem portion and the vertical stem portion,
   wherein the first connecting line extends across all portions of the vertical stem portion in the second direction, and
   wherein the first pixel electrode is disposed between the first transistor and the first contact portion.

2. The liquid crystal display of claim 1, wherein the first pixel electrode further includes a first extension portion protruding in the second direction and overlapping the first contact portion.

3. The liquid crystal display of claim 2, further comprising an insulating layer disposed between the first contact portion and the first extension portion,
   wherein the insulating layer includes an opening overlapping the first contact portion and the first extension portion, and the first contact portion and the first extension portion contact each other through the opening.

4. The liquid crystal display of claim 1, further comprising:
   a first light blocking portion covering the first gate line and the first transistor; and
   a second light blocking portion spaced apart from the first light blocking portion with the first pixel electrode therebetween, the second light blocking portion covering the first contact portion.

5. The liquid crystal display of claim 1, further comprising: a second gate line adjacent to the first gate line; a second transistor including a gate electrode connected to the second gate line, a source electrode connected to the first data line, and a drain electrode; a second connecting line connected to the drain electrode of the second transistor; a second contact portion connected to the second connecting line and adjacent to the first contact portion; and a second pixel electrode connected to the second contact portion, wherein the second pixel electrode is disposed between the second transistor and the second contact portion, the first pixel electrode and the second pixel electrode are disposed between the first gate line and the second gate line, and the first contact portion and the second contact portion are disposed between the first pixel electrode and the second pixel electrode.

6. The liquid crystal display of claim 5, further comprising:
- a first color filter overlapping the first pixel electrode; and
- a second color filter overlapping the second pixel electrode,
- wherein the first color filter and the second color filter are spaced apart from each other with both the first contact portion and the second contact portion therebetween.

7. The liquid crystal display of claim 5, further comprising:
- a liquid crystal layer disposed on the first pixel electrode and the second pixel electrode;
- a second substrate facing each of the first pixel electrode and the second pixel electrode with the liquid crystal layer therebetween; and
- a color filter disposed on the second substrate and overlapping the first pixel electrode the second pixel electrode, the first contact portion, and the second contact portion.

8. The liquid crystal display of claim 5, further comprising:
- a second data line adjacent to the first data line;
- a third transistor including a gate electrode connected to the first gate line and a source electrode connected to the second data line and adjacent to the first transistor; and
- a fourth transistor including a gate electrode connected to the second gate line and a source electrode connected to the second data line and adjacent to the second transistor.

9. The liquid crystal display of claim 8, further comprising:
- a first light blocking portion covering the first gate line, the first transistor, and the third transistor;
- a second light blocking portion spaced apart from the first light blocking portion with the first pixel electrode therebetween, the second light blocking portion covering the first contact portion and the second contact portion; and
- a third light blocking portion covering the second gate line, the second transistor, and the fourth transistor.

10. The liquid crystal display of claim 8, wherein the first data line and the second data line each overlap the first pixel electrode and the second pixel electrode.

* * * * *